United States Patent [19]

Baker et al.

[11] Patent Number: 5,067,139
[45] Date of Patent: Nov. 19, 1991

[54] COHERENT DETECTOR FOR QPSK MODULATION IN A TDMA SYSTEM

[75] Inventors: James C. Baker, Hanover Park; Henry L. Kazecki, Arlington Heights; Steven H. Goode, Barrington, all of Ill.

[73] Assignee: Motorola, Inc., Schaumburg, Ill.

[21] Appl. No.: 628,747

[22] Filed: Dec. 17, 1990

[51] Int. Cl.$^5$ .............................................. H04L 27/22
[52] U.S. Cl. ........................................ 375/86; 375/97; 329/304
[58] Field of Search .................... 375/80, 82, 83, 86, 375/97, 114, 120; 329/304, 308, 345; 370/93; 455/205, 208, 255, 260

[56] References Cited

U.S. PATENT DOCUMENTS

| | | | |
|---|---|---|---|
| 4,466,108 | 8/1984 | Rhodes | 375/97 |
| 4,653,071 | 3/1987 | Sgrignoli | 375/83 |
| 4,795,986 | 1/1989 | Ceroni et al. | 329/30 X |
| 4,896,336 | 1/1990 | Henely et al. | 375/97 |
| 4,916,405 | 4/1990 | Keate et al. | 329/308 |
| 4,959,844 | 9/1990 | Walp | 375/97 |
| 4,965,810 | 10/1990 | Peischl et al. | 329/304 |

*Primary Examiner*—Stephen Chin
*Attorney, Agent, or Firm*—Kenneth W. Bolvin

[57] ABSTRACT

The $\pi/4$-QPSK coherent detector of the present invention has a vector input and an output comprising recovered data in bit pair form. The $\pi/4$-QPSK coherent detector recovers bursts of data, in a TDMA system, that has been encoded in an amplitude modulated vector's phase angle. The $\pi/4$-QPSK coherent detector detects the $\pi/4$-QPSK constellation of the incoming modulated signal and outputs the recovered data stream.

10 Claims, 3 Drawing Sheets

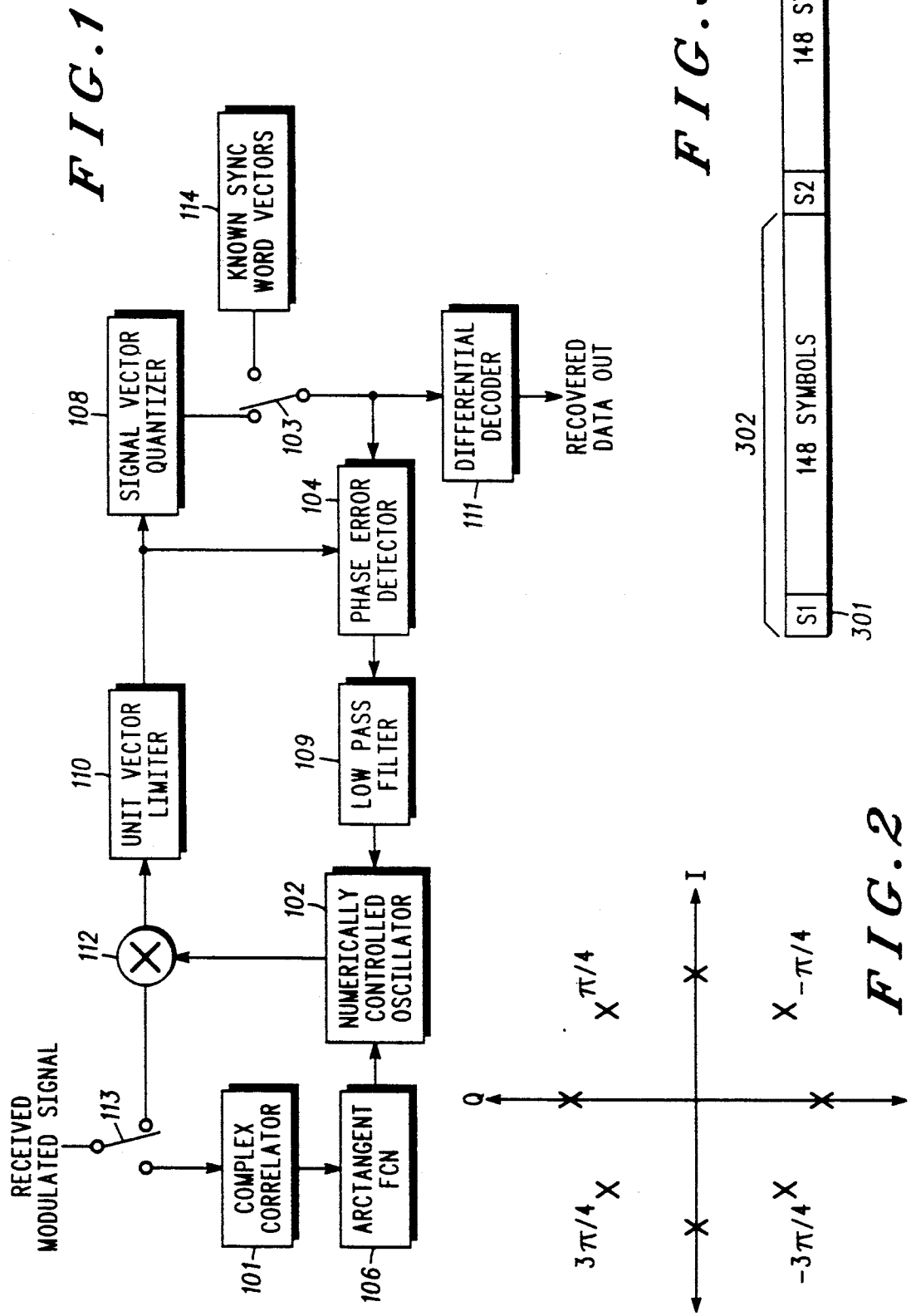

COHERENT DETECTOR FOR QPSK MODULATION IN A TDMA SYSTEM

FIELD OF THE INVENTION

The present invention relates generally to the field of communications and particularly to coherent detection in a digital communication environment.

BACKGROUND OF THE INVENTION

Any modulation method can be represented by a constellation. An example of this is the eight point constellation illustrated in FIG. 2. This constellation is generated from differentially encoded QPSK (DEQPSK or π/4 QPSK) which is a subset of the four state QPSK constellation. Each state is characterized by a vector having the same magnitude, but a different phase angle. Due to the differential encoding of the QPSK signal to generate the π/4-QPSK signal, data recovery may be accomplished with either a coherent or non-coherent detector. Coherent detection exhibits better performance in some situations as compared to non-coherent detection techniques.

In coherent detection, however, the carrier phase must be recovered from the received signal. Also, with π/4-QPSK a known initial 0/45° rotation phase is required as a start-up condition. This is required to determine the initial constellation point of the QPSK constellation. Additionally, environmental fading can rotate the constellation points causing random phase modulation. There is a resulting need for a coherent detector that can determine the initial constellation point rapidly and track the rotating constellation.

SUMMARY OF THE INVENTION

The π/4-QPSK coherent detector of the present invention recovers bursts of data, in a time division multiple access (TDMA) system, that has been encoded in an amplitude and phase modulated signal vector. At the beginning of each frame of data, a synchronization word is transmitted. This synchronization word is detected at the receiver with a complex correlator. Phase information can be extracted from this complex correlation and used to initialize the numerically controlled oscillator (NCO) in the coherent detector digital phase locked loop (DPLL). The detector is first initialized by switching the vector to correlation means to generate a synchronization word correlation vector on which is performed an arctangent function to determine the angle of this vector. Next, during a training period, the known synchronization word is input to the DPLL to train it. The input vector is then switched to the mixer where it is mixed with a signal from a numerically controlled oscillator. The output of this operation is limited to an amplitude of unity. This vector is input to a phase detector that generates a phase error that is filtered and used to control the frequency of the numerically controlled oscillator. The phase detector also generates a phase data signal that is input to a decoder that generates the recovered data.

BRIEF DESCRIPTION OF THE DRAWINGS

FIG. 1 shows the preferred embodiment of the π/4-QPSK coherent detector of the present invention.

FIG. 2 shows the π/4-QPSK constellation of the present invention.

FIG. 3 shows the format of data in a TDMA system.

DETAILED DESCRIPTION OF THE PREFERRED EMBODIMENT

Figure 4:
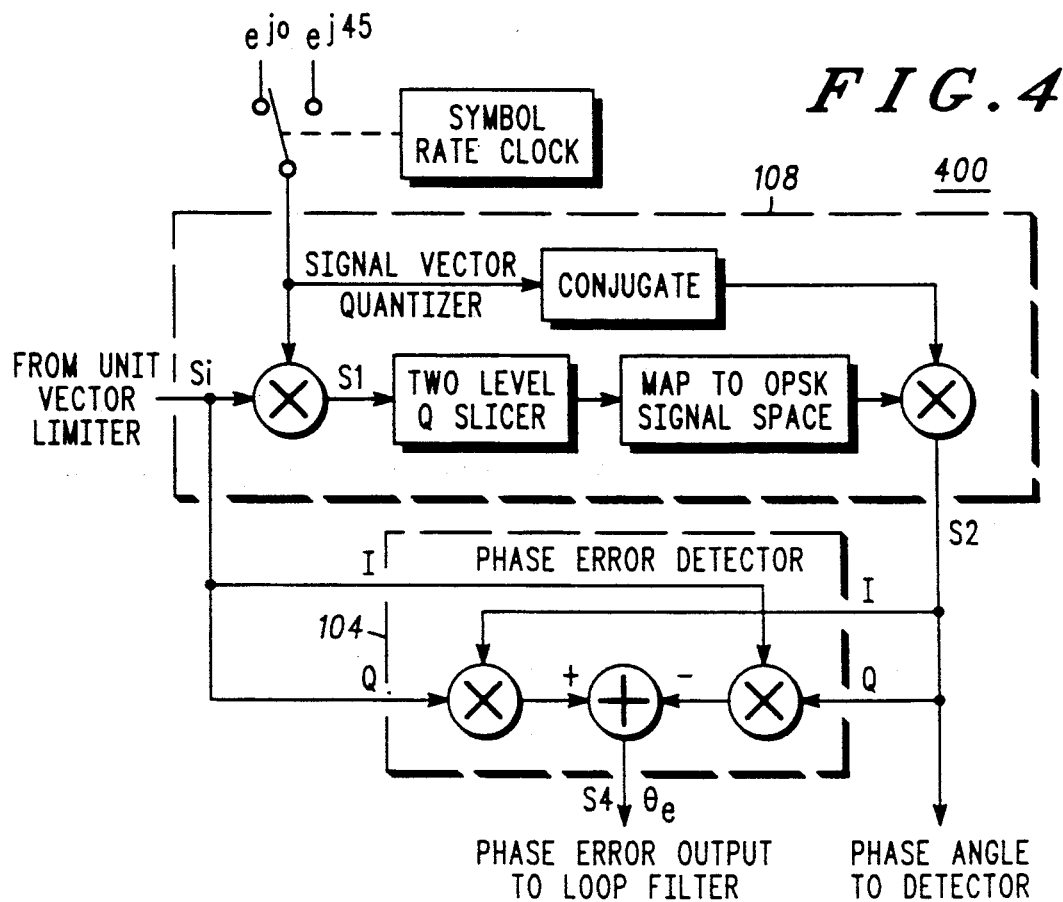
FIG. 4 shows a block diagram of the decision directed phase detector of the present invention.

The π/4-QPSK coherent detector of the present invention, illustrated in FIG. 1, enables recovery of data, in a time division multiple access (TDMA) system, that has been encoded in an amplitude and phase modulated vector. The π/4-QPSK coherent detector detects the π/4-QPSK constellation, illustrated in FIG. 2, of an incoming signal and outputs the recovered data stream. The preferred embodiment of the present invention operates on bursts of symbols and does not require a continuous stream of data.

It is critical in a burst TDMA system to achieve rapid initialization of the coherent detector parameters. Due to the short nature of the burst, 6.6 ms. for the U.S. Digital Cellular (USDC) system, a coherent detector requiring a continuous data stream would not be able to recover the information data symbols. A continuous time detector requires start-up time, usually in excess of 100 ms., before it can begin decoding data. The present invention solves the problem of rapid initialization of coherent detector for use in TDMA system.

Data in a digital cellular transmission system is transmitted in frames of symbols, illustrated in FIG. 3. A synchronizing word (301) is located at the beginning of the frame (302). The synchronization word (301), in burst type systems, is regularly used for performing the time synchronization function. In the present invention, the same synchronization word (301) is further used to achieve rapid start-up coherent detector initialization. The preferred embodiment of the present invention operates in the burst mode by performing a two step training process.

First, the received modulated signal is switched (113) to a complex correlator (101); the (DPLL) is not running at this time. The complex correlator (101) performs a complex correlation on the synchronizing word (301) at the beginning of the frame of symbols (302). The real and imaginary parts of the complex correlation are input to the arctangent block (106) and the angle of the synchronization word correlation vector relative to 0° is generated. This angle is the absolute angle of the first symbol of the synchronization word, assuming the first symbol of the reference synchronization word is 0°. This angle is input to a numerically controlled oscillator (NCO) (102) to initialize the NCO (102) phase for the burst of received data. The synchronization word vector and absolute angle are buffered for later use. This process gives the absolute phase of the incoming data to remove the 45° phase ambiguity for the coherent slicer. The first symbol after the synchronization word will be at 45°, to define the initial start-up 0°/45° rotation for the coherent data slicer.

Second, while the DPLL is running, the buffered synchronization word data (114) is switched (103) to the input of the phase detector (104). Since the absolute phase of the synchronization word is known, the synchronization word can be used to train the DPLL. The loop filter (109) remembers the frequency error from the previous slot and this term along with the phase error drives the NCO (102). The NCO (102) does not have to reacquire frequency lock since frequency offset should not change from data slot to data slot. This step also removes any additional error, from fading or carrier frequency offset, in the loop before data bits must be decoded after the synchronization word. The known synchronization word is switched in only for the duration of the synchronization word. The differential decoder (111) is not operational during the training process. The switch (103) is then returned to the normal operation position, ending the training process.

Once the $\pi/4$-QPSK coherent detector of the present invention is tracking the incoming signal, the received modulated signal is multiplied (112) with the signal from the NCO (102). The vector output from this mixer (112) is next limited in length to unity (110). Since the data to be recovered is encoded in the vector's angle, the length of the vector is not important. For generalized vector modulated signals, for example QAM, the unit vector limiter (UVL) (110) can be used in the coherent carrier recovery block to remove the amplitude modulation. The signal before the UVL (110) is applied to a data recovery block where both the amplitude and phase information is preserved for proper data recovery operation. If the vector is not limited to unity, an undesirable term representing the AM component will appear later in the coherent detector. The limiter operation is accomplished using the following equation:

$$\text{Unit vector} = \frac{V}{\sqrt{I^2 + Q^2}}$$

where V is the vector with AM and I and Q are the ordinate and abscissa components of V. Also, other techniques can be used to perform the unit vector limiter. For example, the arctangent function can be used to generate a UVL signal.

The unit vector is next input to a phase error detector (104), illustrated in FIG. 1, for generating a phase error signal, $\theta_e$ and a signal vector quantizer (108) for determining the phase angle of the input vector. FIG. 4 illustrates an expanded view of the phase error detector and the signal vector quantizer. $\theta_e$ is the difference between the received input vector angle and the closest point on the $\pi/4$-QPSK constellation.

$\theta_e$ is derived from the eight point $\pi/4$-QPSK signal constellation. This derivation, in conjunction with FIG. 4, is as follows:

$$s_i = p(t)e^{j(\theta\pi(t) + \Delta\theta_e)}$$

$$s_2 = e^{j\theta\pi(t)}$$

$$s_4 = Im\ s_i \times s_2{}^* = \sin \Delta\Theta_e$$

$$s_4 \approx \Delta\theta_e \text{ if } \Delta\theta_e < < 1 \text{ radian}$$

since $\sin \theta \approx \theta$ for $\theta < < 1$ radian.

The phase error detector (104) mixes the Q component from the signal vector quantizer (108) output with the I component from the UVL output and subtracts the result from the product of the I component from the coherent slicer and the Q component of the UVL output.

The phase error is filtered by a second order loop filter (109) having a bandwidth of 500 Hz. The filter limits the noise on this signal. The filtered phase error output drives the NCO (102).

Figure 5:
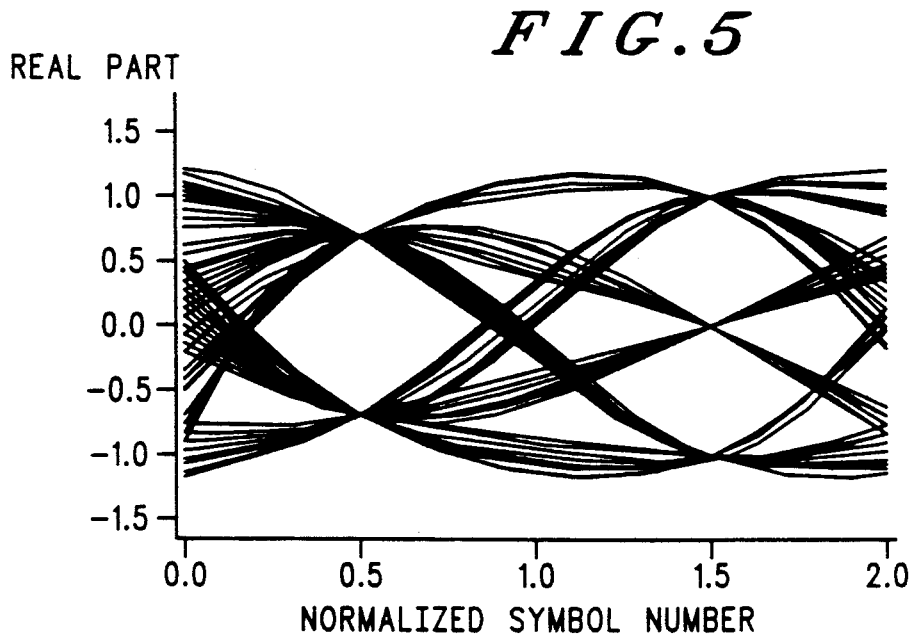
FIG. 5 shows the 5-level eye produced by the π/4-QPSK coherent detector of the present invention.

The coherent slicer is derived by observing the possible states of the $\pi/4$-QPSK waveform where there is an alternating pattern between the axis states and the $\pi/4$ off-axis states. The axis states are represented by a vector of modulus 1 with possible angles of 0, $\pi/2$, $\pi$, and $-\pi/2$ and the off-axis states are represented by a vector of modulus 1 with possible angles of $\pm\pi/4$ and $\pm 3\pi/4$. A 5-level eye, illustrated in FIG. 5, is produced by projecting the vector to the I and Q axis.

The desired data is recovered from this 5-level signal by performing a slice operation and differential decoding to translate the 5-levels into the appropriate binary data. This mapping is commonly referred to as Gray encoding the non-return to zero (NRZ) binary data to the I and Q signal space constellation. Other methods of mapping can also be used for this purpose. A simple 5-level slicing operation will have poor performance due to small differences between decision levels in the data slicer. An optimal coherent slicing operation is derived by noting that the 5-level baseband eyes alternate between 3 and 2 levels at every other symbol time. This is the result of differential encoding which is performed on the QPSK constellation to generate the $\pi/4$-QPSK signal. At every symbol time the new constellation point is generated by a phase shift of $\pm\pi/4$ or $\pm 3\pi/4$ from the previous 8-point constellation point. Due to differential encoding, once an initial start-up phase point is known, the 3 and 2-level flip-flop pattern is defined. Also, the 3-level eye can be mapped to a 2-level eye by performing a $\pi/4$ complex phase shift at the receiver. The 3-level eye is produced by the on-axis constellation points. The noise immunity improvement is due to performing a 2-level slicer operation at the 3-level points of the eye. This is done by rotating the received vector by $\pi/4$, thus generating a 2-level eye to slice without SNR penalty.

The difficulty in terms of implementation is in determining the initial constellation point of the baseband recovered constellation. Finding the initial phase for optimal coherent operation implies extra processing for a DSP based detector. The initial phase is a function of phase offsets between the transmitter and the receiver local oscillator frequency. Random phase modulation due to environmental fading also rotates the constellation points.

The coherent carrier tracking is accomplished with the DPLL approach. The NCO generates the coherent carrier driven by an error signal derived from the QPSK signal constellation. This error signal is related to phase drift caused by channel Doppler fading distortion and local oscillator frequency differences. Random phase modulation due to environmental fading rotates these constellation points. The coherent detector, therefore, must track the phase drift caused by the fading.

Once the input vector's phase angle is determined and the phase error is now close to zero, the vector is input to a differential decoder to determine the corresponding bit pair associated with the angle. This is accomplished by finding the angle in the look-up table and determining the corresponding bit pair:

| Data | $\Theta$ |
| --- | --- |
| 00 | $3\pi/4$ |
| 01 | $\pi/4$ |
| 10 | $-\pi/4$ |
| 11 | $-3\pi/4$ |

Figure 6:
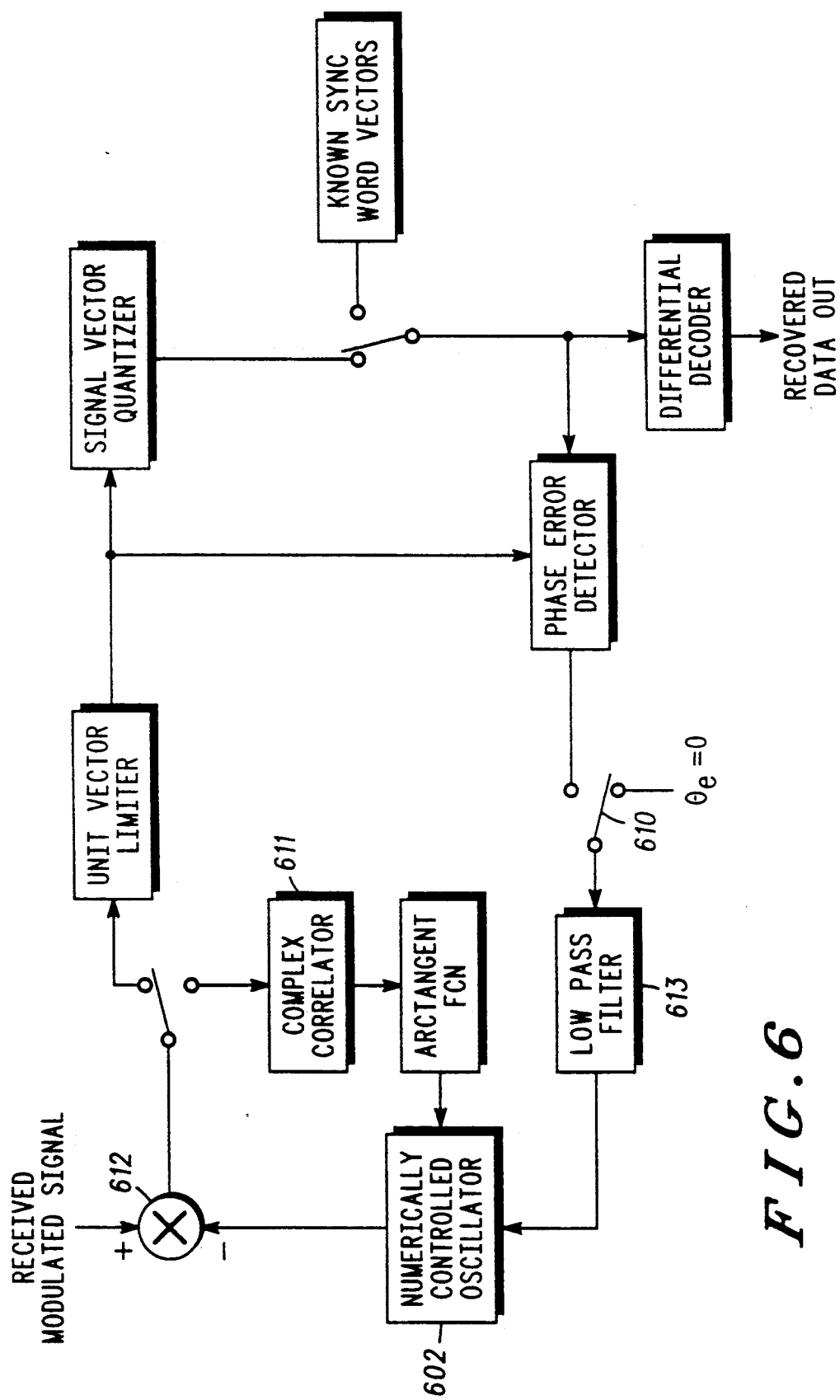
FIG. 6 shows an alternate embodiment of the present invention.

An improved estimate of the correlation vector angle can be obtained if the frequency offset is removed; frequency offset generates an incorrect phase angle. FIG. 6 illustrates an alternate embodiment of the present invention that removes the frequency offset. The correlation (614) in this alternate embodiment is done after the mixer. During the complex correlation, the switch (610) is set to the zero phase error position so that no new phase error is input to the loop and the NCO (602) is reset to 0°. As each symbol of the synchronization word is passed to the correlator (611), it is mixed (612) with the NCO (602) phase being driven by the remembered frequency offset value in the loop filter (613). This removes the frequency offset from the incoming data, thereby improving the estimate of the correlation vector angle.

While the coherent detector of the present invention has been described as a $\pi/4$-QPSK detector, it will also work for any QPSK scheme. Additionally, the coherent detector does not require a continuous stream of data for proper operation. A typical application for this type of detector is in USDC system.

We claim:

1. A coherent detector apparatus having a vector input that has been data modulated and a recovered data output, the data comprising synchronization words and data words, the apparatus comprising:
   a) multiplying means having an output and a first and a second input;
   b) correlation means for generating a synchronization word correlation vector from the vector input;
   c) arctangent function means for generating an angle for the synchronization word correlation vector;
   d) first switching means for coupling the vector input to the correlation means in a first position and the vector input to the first input of the multiplying means in a second position;
   e) vector limiting means, coupled to the output of the multiplying means, for limiting the vector input to unity;
   f) signal vector quantizing means, coupled to the output of the vector limiting means, for generating a quantized received signal vector;
   g) phase error detection means, coupled to the vector limiting means, for generating a phase error signal;
   h) synchronization word storage means for storing the synchronization words;
   i) controllable oscillator means, having a first input coupled to the arctangent function means, a second input coupled to the phase error detection means, for receiving the phase error signal, and an output coupled to the second input of the multiplying means, the controllable oscillator means generating a variable frequency signal in response to the phase error signal when the first switching means is in the second position and in response to the angle when the first switching means is in the first position;
   j) second switching means for coupling the synchronization word storage means to the phase error detection means in a first position and the phase error detection means to the signal vector quantizing means in a second position; and
   k) decoding means, having an input coupled to the signal quantizing means and an output coupled to the recovered data output, for decoding the phase data signal into data bits.

2. The apparatus of claim 1 and further including filtering means coupling the controllable oscillator means to the phase error detection means.

3. The apparatus of claim 1 wherein the controllable oscillator means is a numerically controlled oscillator.

4. The apparatus of claim 1 wherein the coherent detector apparatus is a $\pi/4$-QPSK coherent detection apparatus.

5. The apparatus of claim 1 wherein the coherent detector apparatus is a QAM coherent detection apparatus.

6. A coherent detector apparatus having a vector input that has been data modulated and a recovered data output, the data comprising synchronization words and data words, the apparatus comprising:
   a) mixing means, having an input coupled to the vector input and an output, for mixing a plurality of signals;
   b) correlation means for generating a synchronization word correlation vector;
   c) arctangent function means for generating an angle for the synchronization word correlation vector;
   d) first switching means for switching the mixing means output between the correlation means in a first position and vector limiting means in a second position, the vector limiting means having a unit length vector output;
   e) phase error detection means, coupled to the vector limiting means, for generating a phase error signal form the unit length vector output;
   f) signal vector quantizing means, coupled to the vector limiting means, for generating a quantized received signal vector from the unit length vector output;
   g) synchronization word storage means for storing the synchronization words;
   h) filtering means, coupled to the phase error detection means, for generating a filtered phase error signal;
   i) controllable oscillator means, having a first input coupled to the filtering means, a second input coupled to the arctangent function means, and an output coupled to the mixing means, the controllable oscillator means generating a variable frequency signal in response to the filtered phase error signal when the first switching means is in the second position and in response to the angle when the first switching means is in the first position;
   j) second switching means for coupling the synchronization word storage means to the phase error detection means in a first position and the phase error detection means to the signal vector quantizing means in a second position;
   k) third switching means for switching the filtering means between the phase error detection means and a predetermined value; and
   l) decoding means, having an input coupled to the signal vector quantizing means and an output coupled to the recovered data output, for decoding the phase data signal into data bits.

7. The apparatus of claim 6 wherein the controllable oscillator means is a numerically controlled oscillator.

8. The apparatus of claim 6 wherein the coherent detector apparatus is a $\pi/4$-QPSK coherent detection apparatus.

9. The apparatus of claim 6 wherein the coherent detector apparatus is a QAM coherent detection apparatus.

10. A method of coherent detection for detecting a data modulated input vector, the input vector having a variable length, and converting the input vector to a bit stream of data, the method comprising the steps of:
   a) generating a synchronization word correlation vector from the input vector;
   b) generating an angle for the synchronization word correlation vector;
   c) controlling oscillating means with the synchronization word correlation vector;
   d) limiting the length of a mixed input vector to unit length;
   e) generating a phase error signal and a vector quantized signal from the unit length mixed input vector;
   f) filtering the phase error signal to generate a filtered phase error signal;
   g) controlling oscillating means with the filtered phase error signal to form an oscillating signal that changes frequency in response to the phase error signal and the angle;
   h) multiplying the oscillating signal with the input vector to form the mixed input vector; and
   i) decoding the vector quantized signal to form the bit stream of data.

* * * * *